United States Patent [19]

Dawans et al.

[11] 4,393,151
[45] Jul. 12, 1983

[54] STABLE SUSPENSIONS OF WATER-SOLUBLE POLYMERS AND THEIR MANUFACTURE

[75] Inventors: François Dawans, Bougival; Daniel Binet, Rueil Malmaison; Norbert Kohler, Le Chesnay; Quang Dang Vu, Paris, all of France

[73] Assignee: Institut Francais du Petrole, Rueil-Malmaison, France

[21] Appl. No.: 283,322

[22] Filed: Jul. 15, 1981

[30] Foreign Application Priority Data

Jul. 15, 1980 [FR] France ............................ 80 15586

[51] Int. Cl.³ .................... C08J 3/08; C08K 5/01; C08K 5/09; C08L 5/00
[52] U.S. Cl. ............................. 523/130; 106/171; 166/275; 252/8.55 D; 252/363.5; 523/131; 524/394; 524/400; 524/923
[58] Field of Search ............... 166/275; 252/8.55 D, 252/363.5; 106/171; 260/23 R, 23 AR, 29.2 UA, 29.2 N, 29.6 PM, 29.6 H, 29.6 B; 524/394, 400, 923; 523/130, 131

[56] References Cited

U.S. PATENT DOCUMENTS

| | | | |
|---|---|---|---|
| T870,004 | 1/1970 | Bryan et al. | 524/394 |
| 2,320,527 | 6/1943 | Licata | 106/171 |
| 3,282,874 | 11/1966 | Friedrich et al. | 260/29.6 H |
| 3,292,698 | 12/1966 | Savins | 166/275 |
| 3,402,137 | 9/1968 | Fischer et al. | 260/29.6 H |
| 3,406,031 | 10/1968 | Lee | 106/171 |
| 3,637,564 | 1/1972 | Economou | 260/29.6 H |
| 3,657,182 | 4/1972 | Jolly | 260/29.6 E |
| 3,734,873 | 5/1973 | Anderson et al. | 260/29.6 H |
| 3,763,071 | 10/1973 | Katzer et al. | 260/29.6 E |
| 3,839,202 | 10/1974 | Roy | 260/17.4 SG |
| 4,148,766 | 4/1979 | McClain | 260/29.6 PM |
| 4,148,768 | 4/1979 | McClain | 260/29.6 PM |
| 4,151,133 | 4/1979 | McClain | 524/394 |

FOREIGN PATENT DOCUMENTS

16640 10/1980 European Pat. Off. ............ 524/145

OTHER PUBLICATIONS

Modern Plastics, vol. 30, #6, Feb. 1953, pp. 129, 130, 132, 134 & 218.

Primary Examiner—Ronald W. Griffin
Attorney, Agent, or Firm—Millen & White

[57] ABSTRACT

Stable suspension of a water-soluble polymer comprising solid particles of this water-soluble polymer in a liquid hydrocarbon medium which also comprises a thickening agent selected from the alkali or alkaline-earth metal salts of fatty acids having from 6–33 carbon atoms. The resultant suspensions are stable and dissolve easily when dispersed in water; they can be used in enhanced oil recovery.

22 Claims, No Drawings

STABLE SUSPENSIONS OF WATER-SOLUBLE POLYMERS AND THEIR MANUFACTURE

CROSS REFERENCE TO RELATED APPLICATION

Reference is made under 37 CFR §1.79 to applicants' continuation-in-part application of the instant application, Ser. No. 459,024, filed Jan. 18, 1983.

BACKGROUND OF THE INVENTION

This invention relates to stable suspensions of water-soluble polymers, their manufacture and their use for improving enhanced oil recovery.

The world energy crisis has made it essential to recover as much oil as possible from oil fields.

One of the most widely used methods of enhanced oil recovery consists of flooding the oil field with injected saline water to displace the oil from the porous rock.

The efficiency of this method is, however, very often limited by the viscosity difference between oil and water, which difference causes water to channel directly from the injection well into the production well, instead of spreading through the whole deposit.

It is conventional to reduce this viscosity difference by thickening the injection water with water-soluble polymers, usually with an acrylamide polymer or co-polymer or with a polysaccharide.

The storage and processing of these polymers in the field has raised a number of practical problems.

As a matter of fact, the polymer powder readily absorbs water from the air, resulting in swelling and the formation of agglomerates and/or microgels. These agglomerates tend to stick on the walls, and thus inhibit the operation of the mixing devices, particularly the feed screw.

The microgels, on the other hand, do not dissolve easily in water, and, once injected into the field, they tend to obstruct the field by clogging the pores of the oil-containing rocks.

Still further, the polymer powder when spread on the ground and into the air, makes the ground thick and slippery and the atmosphere hardly breathable, thus raising environmental and safety problems.

It has been proposed, in the prior art, to obviate these various drawbacks by using certain techniques for dispersing solid particles of water-soluble polymers in a liquid which is a non-solvent for the polymer.

It has thus been taught to admix the polyacrylamide with glycerin (for example, in U.S. Pat. No. 3,839,202), with polyethylene glycol (for example, in U.S. Pat. No. 3,402,137 or British Pat. No. No. 1,387,367), with ethylene glycol in the presence of an emulsifying agent (for example, in U.S. Pat. No. 3,657,182) or with an organic water-immiscible liquid to which water is added in order to make the polymer swell (for example, in the U.S. Pat. No. 3,282,874).

However the main difficulty, when preparing polymer suspensions according to the above methods of the prior art, lies in the instability of the suspensions during storage, resulting in their decantation or thickening due to the progressive swelling of the polymer in the presence of one of the ingredients; this instability in the course of time results in the formation of compositions which are no longer uniform and which are thickened. Their processing and their use become therefore more difficult and hazardous.

Compositions of water-soluble polymers and particularly ethylene oxide polymers, which dissolve easily in water, have been described, for example, in the European Patent Application No. 0 002 368. When fluid compositions are obtained by dispersing a water-soluble polymer in an organic liquid which is insoluble in water, in the presence of a non-ionic emulsifying agent, there is observed a separation of the compositions when stored at room temperature. It is the reason why it has also been proposed to add to the composition a thickening agent such as finely dispersed silica, asbestos or soaps such as aluminum stearate. However, these compositions are not adapted to the further preparation of aqueous solutions of polymers to be used in the enhanced oil recovery. As a matter of fact, it has been observed that the thickening agents of the prior art result in secondary reactions of cross-linking or degradation in the presence of the water-soluble polymers used in enhanced oil recovery, more particularly acrylamide polymers or co-polymers. These secondary reactions result in the formation of microgels which clog the porous media where they induce a viscosity decrease of the aqueous solutions and consequently a loss of efficiency for oil recovery.

It has also been proposed in the prior art to effect enhanced oil recovery with the use of aqueous emulsions of polymers, as directly prepared when manufacturing the polymer, as disclosed, for example, in the U.S. Pat. Nos. 3,637,564, 3,734,873 and No. 3,763,071. The addition of water, which is required in this technique, is however unfavorable to the transportation and the storage of the product in the field.

SUMMARY

It is thus advantageous, and this is the object of this invention, to obtain stable anhydrous suspensions of water-soluble polymers which remain uniform and fluid during storage, which dissolve easily when dispersed in water and which finally lead to dilute aqueous solutions suitable for enhanced oil recovery.

As a rule, the stable suspensions of water-soluble polymers according to the invention consist essentially of compositions comprising, for 100 parts b.w. (b.w. means by weight) of an aliphatic or aromatic liquid hydrocarbon, substantially non-solvent for the concerned water-soluble polymers:

(a)-from 40 to 150 parts b.w. of at least one water-soluble polymer in the solid state (powder, beads, agglomerates . . . ), the size of the solid particles ranging, as a rule, between 10 microns and 1 mm, (b)-from 0.1 to 5 parts b.w. of at least one thickening agent selected from the alkali or alkaline-earth metal salts of the higher fatty acids, and optionally (c)-from 0.1 to 5 parts b.w. of at least one non-ionic or anionic surfactive agent.

As a rule, the water-soluble polymers (a) which are used to manufacture stable suspensions according to the invention, are selected from the linear or branched polyalkanes having sufficient hydrophilic groups to make the polymer soluble in water, the hydrophilic groups being preferably selected from the carboxylates, sulfonates, amines, imines, ammonium, carboxamides, imides, hydroxy, acetyl, cetyl, carbamates or lactams groups.

The choice of the water-soluble polymers, as concerns their chemical composition and their molecular weight is determined essentially by their properties in aqueous solution and their efficiency for enhanced oil recovery.

Preferably the polymers or copolymers result from the polyaddition of vinylic or acrylic monomers having hydroxy or amide substituents, such as polyvinyl alcohol, cellulosic derivatives, such as carboxymethylcellulose, hydroxyethylcellulose and carboxymethylhydroxyethylcellulose, polysaccharides, such as xanthan or scleroglycan gums, polyacrylic and polymethacrylic acids and their salts, polyacrylamides and polymethacrylamides, poly-N-dimethylamino-acrylamides, acrylamide-acrylic acid copolymers, ethylene-acrylic acid copolymers and styrene-maleic acid copolymers.

Preferred water-soluble polymers are selected from the group consisting of the partially hydrolyzed polyacrylamides, the copolymers of acrylamide with acrylic acid and the polysaccharides.

The liquid hydrocarbon medium, which is a non-solvent for the contemplated water-soluble polymers, is selected generally from the aliphatic or aromatic hydrocarbons which are liquid at room temperature, having preferably from 5 to 30 carbon atoms; more particularly from petroleum cuts such as kerosenes, gasolines, naphthas, gas-oils or fuel-oils.

The selection of the thickening agent (b) used in the suspensions of the invention is essential to avoid the water-soluble polymers from entering into secondary reactions of gel-forming or degradation; the thickening agent (b) is selected from the alkali or alkaline-earth metal salts of the higher fatty acids, of the natural or synthetic type, having from 6–33 carbon atoms, such as the lithium, sodium, potassium or calcium salts obtained from the caproic, caprylic, capric, pelargonic, lauric, myristic, arachidic, eicosane-carboxylic, behenic, lignoceric, cerotic, melissic, psyllostearylic, undecylenic, elaidic, ricinoleic, eruic, geranic and linoleic acids. The sodium salts are preferred.

Preferably sodium salts are used, particularly those of the palmitic, stearic and oleic acids and their mixtures, such as found in the usual soaps.

The further dispersion of the suspensions into an aqueous phase, and thus the dissolution of the hydrophilic polymer, is facilitated by using a surfactant (c) in the suspensions of the invention. It is then used in a proportion from 0.1 to 5 parts b.w. for 100 parts b.w. of the liquid hydrocarbon medium; it can be selected, on the one hand, from the non-ionic hydrophilic emulsifiers, such as the condensation products of the higher fatty alcohols, the amides of the higher fatty acids or the alkylphenols with ethylene oxide, or the esters obtained from polyethylene glycol and long chain fatty acids, and, on the other hand, from the anionic hydrophilic emulsifiers, such as the alkali metal salts of the alkyl and/or aryl sulfonic, alkylsulfosuccinic or sulfonic acids obtained from petroleum fractions and the alkali metal alkyl- or alkylene sulfates.

By way of illustration of emulsifying agents well-known to those skilled in the art and used alone or as mixtures, there can be mentioned: polyethoxylated nonylphenols, octylphenol polyethoxyethanol, tetraethylene glycol monopalmitate, hexaethylene glycol monolaurate, nonaethylene glycol monostearate, sodium sulfosuccinate di-octyl ester, sodium diethyl-hexyl sulfosuccinate, sodium monostearyl sulfosuccinate, sodium lauryl sulfonate, potassium stearylsulfonate, sodium laurylsulfate and petroleum sulfonates.

The stable anhydrous suspensions of water-soluble polymers in a non-solvent hydrocarbon medium are usefully prepared as follows.

In a first step, the desired proportion of thickening agent (b) and, optionally, an appropriate proportion of surfactants (c) are added to the liquid hydrocarbon or to the hydrocarbon cut used as non-solvent medium. The resulting mixture is heated, preferably under stirring, at a temperature of 40° to 150° C., for example for 5 minutes to 1 hour, and then progressively cooled down to a temperature below 40° C., for example, down to room temperature.

In a second step, the solid particles of water-soluble polymer (a) are progressively added in a sufficient amount while stirring.

The suspensions of water-soluble polymers conforming to the invention can be processed and used easily in an oil field to improve enhanced oil recovery.

They have various advantages which are mentioned below.

They are stable when stored. They have sufficient fluidity to make their handling, their transfer and their processing easy. They can be extruded easily.

The conditioning of the water-soluble polymers as a suspension in a hydrocarbon medium imparts to them a good protection against humidity (particularly air humidity) and against the formation of agglomerates and/or microgels. In addition, this type of conditioning has the particular advantage of a better protection against oxygen, in the dissolution step, and against oxidizing agents generally, as compared with conventional powders. For example, it is no more necessary to add protective agents, such as sulfites or formaldehyde, to the water used for dissolving the polymers; as a matter of fact, the injection of the compositions of the invention can be made on-line without supplying external oxygen and with the use of oil-field water considered as airfree.

The suspensions of water-soluble polymers according to the invention are also protected against mechanical degradation. The mixtures can thus be passed through pipes or perforated discs without excessive pressure drop.

The suspensions of the invention have also a high content of water-soluble polymer, for example from 30 to 60% b.w., thus representing an economic advantage as concerns the conditioning of the water-soluble polymers.

These suspensions have also the advantage of easy dispersibility in the aqueous phase and of a high rate of dissolution of the polymers into water; in particular, it has been checked that the maximum viscosity of the aqueous solutions prepared from the compositions of the invention is attained after a far shorter time than when directly dispersing the powdered water-soluble polymer, according to the techniques of the prior art. In addition, starting from the compositions of the invention, there is quickly obtained (generally in less than 2 hours) a constant value of viscosity, as measured with a screen viscosimeter (see, for example, R. R. Jennings, J. H. Rogers and T. J. West in J. Pet. Tech., March 1971, pages 391 to 401), which confirms the absence of aggregates and the quality of the resultant aqueous solutions.

It has finally been shown that the viscosity of the dilute aqueous solutions of the stored polymers does not vary for several weeks, which is not the case of the solutions obtained from the compositions of water-soluble polymers of the prior art.

For use in enhanced oil recovery, water is added, for example oil-field water, to the suspensions of the invention, so as to bring the concentration of the water-soluble polymer, in the aqueous phase, to a value commonly selected between 0.005 and 1% b.w. of water.

The above advantageous properties confirm the capacity of the suspensions conforming to the invention to be used in enhanced oil recovery.

The following examples illustrate the invention; they must not be considered limitative thereof.

EXAMPLE 1

7.5 g of sodium bis (2-ethyl hexyl) sulfosuccinate, 2.5 g of polyethoxylated nonylphenol and 5 g of a mixture of sodium palmitate, stearate and oleate (white soap of the trade) are added successively to 1000 g of gas-oil. The mixture is vigorously stirred at 80° C. for 15 minutes; it is then cooled to 20° C. 1100 g of powdered partially hydrolyzed polyacrylamide (Pusher 700, a product of the trade, sold by Dow Chemicals) are then progressively added to the stirred mixture. The resulting final mixture is stable for several weeks, even when in contact with air; it is sufficiently fluid to be handled; when it is dispersed into 22 l of water, a solution is obtained after 60 minutes at room temperature. When the aqueous solution is filtered, no residual solid particles are observed; the determination of the viscosity of the aqueous solution with a capillary viscosimeter and a screen viscosimeter confirms that the dissolution of the polymer is complete after 90 minutes. If the dilute aqueous solution is stored at room temperature, the viscosity loss is lower than 5% after 3 days and lower than 10% after 4 weeks.

EXAMPLE 1A (comparison)

Example 1 has been repeated in the absence of the sodium palmitate, stearate and oleate mixture, the other conditions being unchanged. The final mixture settles after a few hours and cannot be handled any more.

EXAMPLE 1B (comparison)

Example 1 has been repeated; however the thickening agent based on sodium salts has been replaced by an equal amount of a thickening agent based on finely divided silica (CAB-O-SIL M-5 manufactured by CABOT Corp.), the other conditions being unchanged. When the dilute aqueous solution obtained from this composition is stored at room temperature, a viscosity decrease of 24% after 3 days and 47% after 4 weeks is observed.

EXAMPLE 2

Example 1 has been repeated in the absence of sodium bis (2-ethyl hexyl)sulfosuccinate and polyethoxylated nonylphenol, the other conditions being unchanged; the final mixture remains stable and fluid, but the dissolution of the polyacrylamide in water is slower. Several hours are required to obtain a filterable solution and a substantially constant viscosity measured with a screen viscosimeter: this viscosity decreases by 1% in 3 days and 4% in 4 weeks.

EXAMPLE 3

5 g of sodium monostearyl-sulfosuccinate, 5 g of polyethoxylated octylphenol and 20 g of sodium palmitate are successively added to 1000 g of domestic fuel-oil. The mixture is stirred at 100° C. for 30 minutes; it is then cooled down to room temperature and 820 g of powdered polysaccharide (xanthan gum, Rhodopol 23 P from Rhone Poulenc Industries) is progressively added to the stirred mixture. The resulting mixture does not settle after several weeks of storage. When dispersed in an excess of water, the polysaccharide dissolves quickly, without formation of microgel, the viscosity of the resultant aqueous solutions being controlled with a capillary viscosimeter. When filtering the aqueous solutions through a 3 $\mu$m filter, it is found that no viscosity loss occurs, thus no loss of polysaccharide concentration.

EXAMPLE 3A (comparison)

By way of comparison, this example is repeated without heating the mixture to 100° C. prior to the addition of the polysaccharide, the other conditions being unchanged. The final product settles after a few hours of storage and the suspension is no longer uniform.

EXAMPLE 3B (comparison)

The mixture of sodium palmitate, stearate and oleate is replaced by an equivalent molar proportion of aluminum stearate. It is found that the final suspension of polysaccharide settles after 3 hours when stirring is discontinued. When filtering an aqueous solution of polymer, obtained by dispersion into water of the above suspension, it is found that the polysaccharide concentration of the filtrate, determined by measure of its viscosity, is only 15% of the polysaccharide concentration of the solution subjected to this filtration (filtration effected at constant rate through a 3 $\mu$m filter).

EXAMPLE 4

5 g of soap of the trade, based on a mixture of sodium palmitate, stearate and oleate and 10 g of sodium laurylsulfate are added successively to 1000 g of naphtha. The mixture is vigorously stirred at 70° C. for 15 minutes and then cooled to 20° C. 1000 g of powdered partially hydrolyzed polyacrylamide (acrylamide-acrylic acid copolymer; Petrogil AD 37, a product of the trade, available from Rhone Poulenc Industries) is slowly added to the stirred mixture. The suspension of polymer remains stable for several weeks and it is sufficiently fluid to be handled and dispersed in an excess of water, in order to obtain a filterable aqueous solution. This solution can be filtered through a filter of a 3 $\mu$m pore size, at a constant flow rate, without loss of viscosity.

EXAMPLE 4A (comparison)

By way of comparison, the mixture of sodium palmitate, stearate and oleate is replaced by an equivalent molar proportion of aluminum stearate, the other conditions being the same. It is found that the polymer suspension settles after 2 hours when stirring is discontinued and that the polymer is partially insoluble when the suspension is dispersed in aqueous phase. As a matter of fact, when this solution is filtered at a constant rate through a filter having a pore size of 3 $\mu$m, it is found, by measure of viscosity, that the polymer concentration of the filtrate is only 10% of the polymer concentration of the solution subjected to filtration.

What is claimed is:

1. A stable anhydrous suspension of a water-soluble polymer, consisting essentially of solid particles of at least one water-soluble polymer suspended in (a) a liquid hydrocarbon medium, non-solvent for the water-soluble polymer, said liquid hydrocarbon medium comprising at least one aliphatic or aromatic hydrocarbon, the proportions being 40 to 150 parts by weight of said water-soluble polymer per 100 parts by weight of said liquid hydrocarbon medium, said stable anhydrous suspension further comprising per 100 parts by weight of said liquid hydrocarbon medium, from 0.1 to 5 parts by weight of (b) at least one thickening agent selected from the alkali or alkaline-earth metal salts of fatty acids having 6-33 carbon atoms.

2. A stable anhydrous suspension of a water-soluble polymer according to claim 1, wherein said thickening agent (b) is a sodium salt of a fatty acid having 6-33 carbon atoms.

3. A stable anhydrous suspension of a water-soluble polymer according to claim 1 wherein said water-soluble polymer consists of at least one polyalkane comprising a sufficient number of hydrophilic groups selected from the carboxylates, sulfonates amines, imines, ammonium, carboxamides, imides, hydroxy, acetyl, cetyl, carbamates and lactams, to be soluble in aqueous medium.

4. A stable anhydrous suspension of a water-soluble polymer according to claim 1 wherein said water-soluble polymer is selected from polyvinyl alcohol, carboxymethylcellulose, hydroxyethylcellulose, carboxymethylhydroxyethyl cellulose, polysaccharides, polyacrylic and polymethacrylic acids, their salts, polyacrylamide, polymethacrylamide, poly-N-dimethylamino acrylamide and the acrylamide-acrylic acid, ethylene-acrylic acid and styrene-maleic acid copolymers.

5. A stable anhydrous suspension according to claim 1 wherein the water-soluble polymer is selected from the partially hydrolyzed polyacrylamides, the copolymers of acrylamide with acrylic acid and the polysaccharides.

6. A stable anhydrous suspension of a water-soluble polymer according to claim 1 wherein the particles of said water-soluble polymer have a size from 10 microns to 1 mm.

7. A stable anhydrous suspension of a water-soluble polymer according to claim 1 wherein said hydrocarbon medium comprises at least one aliphatic or aromatic hydrocarbon which is liquid at room temperature and comprises from 5 to 30 carbon atoms.

8. A stable anhydrous suspension of a water-soluble polymer according to claim 7, wherein said hydrocarbon medium consists of a petroleum cut selected from kerosenes, gasolines, naphthas, gas-oils and fuel-oils.

9. A stable anhydrous suspension of a water-soluble polymer according to claim 1 which further comprises, for 100 parts by weight of said non-solvent hydrocarbon medium, from 0.1 to 5 parts by weight of at least one surfactive selected from the hydrophilic non-ionic emulsifying agents and the hydrophilic anionic emulsifying agents.

10. A stable anhydrous suspension according to claim 9, wherein the surfactant is a condensation product of ethylene oxide with any of a higher fatty alcohol, an amide of a higher fatty acid, or an alkyl phenol, en ester of polyethylene glycol and a long chain fatty acid, an alkali metal salt of alkyl, aryl sulfonic, alkyl sulfosuccinic, or sulfonic acids, and an alkali metal alkyl or alkaline sulfate.

11. A stable anhydrous suspension according to claim 9, wherein said surfactant is a polyethoxylated nonylphenol, octylphenol polyethoxyethanol, tetraethylene glycol monopalmitate, hexaethylene glycol monolaurate, nonaethylene glycol monostearate, sodium sulfosuccinate di-octyl ester, sodium diethyl-hexyl sulfosuccinate, sodium monostearyl sulfosuccinate, sodium lauryl sulfonate, potassium stearylsulfonate, sodium laurylsulfate or a petroleum sulfonate.

12. A stable anhydrous suspension according to claim 1, wherein said water-soluble polymer is a co-polymer of acrylamide and acrylic acid, or xanthan gum.

13. A process for manufacturing a stable anhydrous suspension of a water-soluble polymer according to claim 1 wherein, in a firt step, a thickening agent (b) is added to the liquid hydrocarbon medium, while heating at a temperature of 40° to 150° C., and in a second step, after cooling of the mixture below 40° C., solid particles of the water-soluble polymer are added progressively.

14. A stable anhydrous suspension as produced by the process of claim 13.

15. A stable anhydrous suspension according to claim 14, wherein said water-soluble polymer is a partially hydrolyzed polyacrylamide, a co-polymer of acrylamide with acrylic acid, or a polysaccharide.

16. A process according to claim 13, wherein at least one surfactant selected from the non-ionic emulsifying agents and the anionic emulsifying agents is further added to the liquid hydrocarbon medium in the course of the first step.

17. A stable anhydrous suspension as produced by the process of claim 16.

18. A process for manufacturing a stable suspension of a water-soluble polymer, consisting essentially of solid particles of at least one water-soluble polymer suspended in (a) a liquid hydrocarbon medium, non-solvent of the water-soluble polymer, said liquid hydrocarbon medium comprising at least one aliphatic or aromatic hydrocarbon, the proportions being 40 to 150 parts by weight of said water-soluble polymer per 100 parts by weight of said liquid hydrocarbon medium, said stable suspension further comprising per 100 parts by weight of said liquid hydrocarbon medium, from 0.1 to 5 parts by weight of (b) at least one thickening agent selected from the alkali or alkaline-earth metal salts of fatty acids having 6-33 carbon atoms, said process consisting essentially of, in a first step, adding said thickening agent (b) to the liquid hydrocarbon medium, while heating at a temperature of 40°-150° C., and in a second step, after cooling of the mixture below 40° C., adding progressively to the resultant mixture of thickening agent and hydrocarbon medium said solid particles of the water-soluble polymer.

19. A process according to claim 18, wherein at least one surfactant selected from the non-ionic emulsifying agents and the anionic emulsifying agents is further added to the liquid hydrocarbon medium in the course of the first step.

20. An aqueous solution of polymer for use in enhanced oil recovery and obtained by dispersing in water a stable anhydrous suspension of a water-soluble polymer according to claim 1 said solution having a concentration of water-soluble polymer from 0.005 to 1% by weight with respect to water.

21. In an enhanced oil recovery process comprising flooding an oil field by injecting an aqueous solution in an injection well so as to displace the oil from the underground rock formation into the production well, the improvement comprising adding to the aqueous solution the stable suspension of a water-soluble polymer as defined by claim 1.

22. In an enhanced oil recovery process comprising flooding an oil field by injecting an aqueous solution in an injection well so as to displace the oil from the underground rock formation into the production well, the improvement comprising adding to the aqueous solution the stable suspension of water-soluble polymer as defined by claim 15.

* * * * *